T. WILSON.
INCUBATOR.
APPLICATION FILED MAY 7, 1912.

1,093,231.

Patented Apr. 14, 1914.

WITNESSES:
F. C. Matheny
Horace Barnes

INVENTOR
Thomas Wilson
BY
Pierre Barnes
ATTORNEY

UNITED STATES PATENT OFFICE.

THOMAS WILSON, OF SEATTLE, WASHINGTON, ASSIGNOR OF ONE-HALF TO PAUL WILSON, OF SEATTLE, WASHINGTON.

INCUBATOR.

1,093,231.  Specification of Letters Patent.  Patented Apr. 14, 1914.

Application filed May 7, 1912. Serial No. 695,713.

*To all whom it may concern:*

Be it known that I, THOMAS WILSON, a citizen of the United States, residing at Seattle, in the county of King and State of Washington, have invented certain new and useful Improvements in Incubators, of which the following is a specification.

This invention relates to improvements in incubators for egg hatching.

One of the objects of the invention is the provision of an improved thermostatic heat regulator whereby the egg chamber is readily maintained at a practically uniform temperature.

A further object of the invention is the provision of new and improved water circulating devices whereby heat is uniformly distributed throughout the egg chamber and an even and constant circulation is effected.

The invention consists in the novel construction and adaptation of devices as heretofore outlined in combination with an incubator of suitable construction, as will be further described in the following specification, illustrated in the accompanying drawings and finally set forth in the appended claims.

Figure 1:
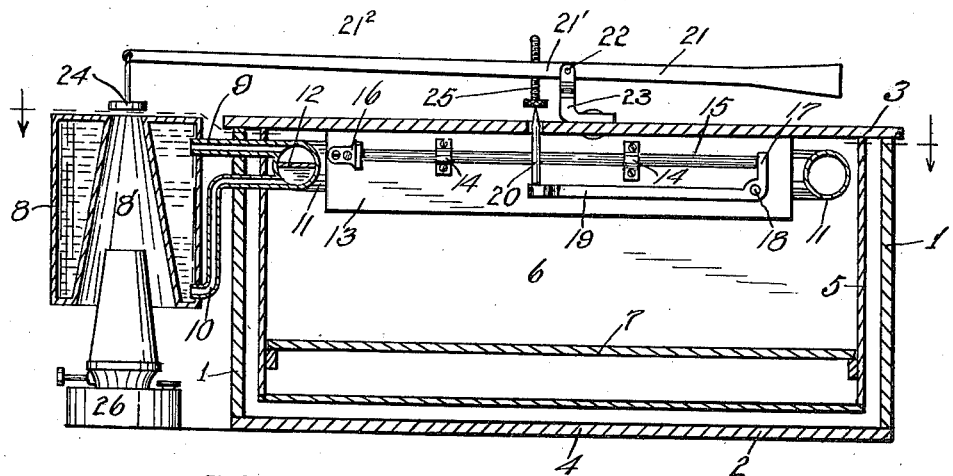
Figure 2:
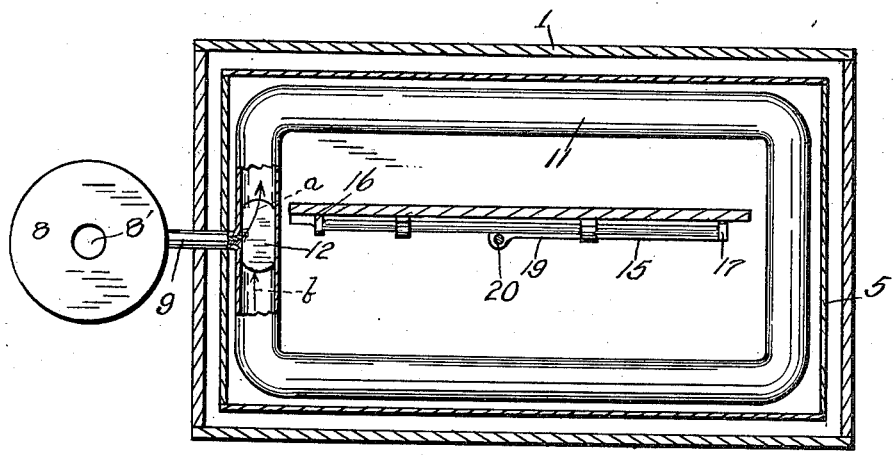
Figure 3:
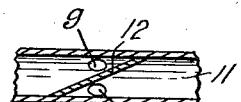

In the accompanying drawings, Figure 1 is a view in vertical section of apparatus embodying my invention. Fig. 2 is a sectional view taken on the lines 2—2 of Fig. 1 partly broken away. Fig. 3 is a fragmentary view in vertical section of devices employed in my invention.

Referring to said drawings, the reference numeral 1 designates the outer walls of an incubator, 2 the bottom wall and 3 the top or removable cover. Spaced apart from said walls 1 and 2 to afford an air space 4 therebetween, is an interior casing 5 inclosing an egg chamber 6 in which may be positioned one or more egg trays as 7. Exteriorly of said incubator is a water heater 8 of any suitable construction desirably having a central flue 8' converging toward its upper end. Said heater is further provided with hot water discharge pipe 9 in proximity of its upper end and a return pipe 10 near its lower end. Said pipes 9 and 10 may be positioned in the same vertical plane and establish circulating communication between said heater and a continuous tubular radiator 11 located in the upper portion of said chamber 6. The cross section of said radiator and hence its cubic capacity is relatively large and the pipes 9 and 10 pierce its walls close to the upper and lower portions thereof, respectively. Such openings are spaced apart vertically and are separated by an imperforate inclined dividing plate 12 fixedly secured to the interior walls of the radiator to prevent any passage of water from one such opening to the other except by the circuitous passage through said radiator. Hot water flowing into said radiator through the upper pipe 9 thus flows in the direction, as indicated by the arrow $a$ in Fig. 2. The relatively large volume of water contained in said radiator moves slowly toward the discharge and maintains a temperature within the egg chamber at a relatively constant temperature as it thus gives off its heat slowly and uniformly in its comparatively sluggish circulation. The course of water discharged through the lower pipe 10 is indicated by the dart $b$. Said pipe, as shown, is located below said inclined plate 12 and thus receives the discharged water with the least possible interruption to its natural flow.

Referring now to Fig. 1, the reference numeral 13 denotes a vertically disposed plate of wood or of other suitable material not subject to expansion or contraction through changes of temperature. Slidably secured to said plate in brackets 14 is a relatively long rod 15 of metal or composition subject to considerable extension or retraction of its length by corresponding changes in the surrounding temperatures. One end of said rod is butted against a fixed stop 16 and its other end engages the short arm 17 of a bell-crank lever fulcrumed at 18 whose longer arm 19 rigidly supports a vertically disposed pin 20 extending through an aperture in said top 3.

The numeral 21 designates a balanced lever pivoted at 22 in a bracket 23 and provided at the extremity of its longer end with a dependent damper 24 arranged to close more or less the upper end of said flue 8'. In proximity of its pivotal connection 22, said longer end is provided with a vertically arranged adjustment screw 25 in vertical alinement with said pin 20 and formed with a bearing at its lower end to contact with the pointed upper end of said pin.

The operation of said devices may be described as follows: The changes of temperature within said chamber 6 will affect the rod 15 causing it to expand or contract longitudinally and influence the movements of the arm 17 correspondingly which communicates movement in a transverse direction to the longer arm 19 through pin 20 and screw 25 to the longer end of the lever 21, raising or lowering the latter together with the damper 24 as the rod 15 is expanded or contracted. The expansion of said rod directly pushes arm 17 and the contraction of said rod with the withdrawal of its impelling force upon said arm, permits the heavier arm 19 to exert itself and lower the superimposed lever 21 correspondingly to the contractal movement of said rod. The raising of said damper permits of the passage thereby and an escape directly upward of a larger portion of the heat furnished by the lamp 26. The lowering of the damper causes the heat to escape more or less about the bottom edges of the flue 8 and in so doing, a larger portion is absorbed by the water contained within the heater. Thus as the temperature within the chamber 6 increases resulting in a lengthening of the rod 15, the damper 24 is correspondingly raised until the escape of the heat thereby causes a drop in temperature of the water supplied to the radiator and effects the shortening of the rod which in turn will permit the lowering of the damper and gradually raise the temperature of the water supplied to the radiator.

Adjustments may be made as indicated, through manipulation of the screw 25 to precisely arrange the amount of opening afforded by the damper 24 in its various positions. When thus suitably adjusted the device works automatically and tempers the internal condition of the egg chamber within close limits and with certainty.

The amount of expansion and contraction of the rod 15 is magnified in its effect upon the damper 24 by the relative difference in length of the arms 17 and 19 of the bell-crank and further by the relative length of the portions 21′ of the lever between the adjustment screw 25 and the pivot 22 and that portion 21² between said screw and the extremity of said end.

The invention is extremely simple in its construction and operation. It has few parts to get out of order and is well adapted to serve the purposes for which it is intended. Particular attention is called to the merits of the water circulation afforded by the construction disclosed. The application of the inclined division plate in the radiator between the supply and return flow pipes causes the water to flow evenly and steadily in its natural course according to its specific gravity through difference in temperature. The warmer water entering the radiator flows into the top and is deflected by the inclination of the plate while the discharge water flows from the radiator in proximity of its bottom and likewise directed through said plate.

Having described my invention, what I claim is,—

1. In an incubator, the combination with a water heater having a vertical draft flue, a balance lever pivotally mounted upon the top of the incubator, a damper upon one end of said lever arranged for movement over said draft flue, a wooden plate edge-wise positioned within said incubator longitudinally and secured to the top thereof, an expansion rod longitudinally slidably positioned upon one side of said plate, a fixed stop upon said plate abutting against one end of said rod, a bell crank pivoted to said plate at the opposite end thereof from said stop and having a short end engaging the opposite end of said rod, a vertically-disposed pin rigidly mounted in the other and longer of said arms of said crank and positioned substantially centrally of said rod, and an adjusting member secured in said lever in contact with the upper end of said pin.

2. In an incubator, the combination with a water heater having a draft flue, water tubes arranged in the incubator and communicating with said heater, a removable cover for said incubator, a balance lever pivoted upon the top of said cover, a longitudinal plate secured along one of its side edges to the under face of said cover, an expansion rod mounted on one side of said plate, a bell-crank lever having a relatively long and short arm pivoted to said plate, said plate provided with means engaging one end of the rod to prevent the expansion of the rod in one direction, the other end of said rod engaging the short arm of said lever, the end of the longer arm provided with a flattened portion, and a pin extending through said cover engaging at its upper end the balance lever adjacent the pivot point and resting at its lower end upon the bell-crank lever.

Signed at Seattle, this 30th day of April, 1912.

THOMAS WILSON.

Witnesses:
HORACE BARNES,
H. LEHMAN.

Copies of this patent may be obtained for five cents each, by addressing the "Commissioner of Patents, Washington, D. C."